United States Patent [19]

Howard et al.

[11] Patent Number: 4,703,541
[45] Date of Patent: Nov. 3, 1987

[54] APPARATUS FOR EXTRACTING MEAT FROM CRUSTACEAN APPENDAGES

[76] Inventors: Peter R. Howard, 71 Semont Rd., Dorchester, Mass. 02124; Mance Ekas, 194 Main St., Norwell, Mass. 02061; Frank J. Rizzo, 16 Waverly St., Everett, Mass. 02149

[21] Appl. No.: 863,104

[22] Filed: May 14, 1986

[51] Int. Cl.[4] ............................................. A22C 29/02
[52] U.S. Cl. ............................................. 17/71; 17/48; 17/51
[58] Field of Search ..................... 17/48, 51, 71, 73

[56] References Cited

U.S. PATENT DOCUMENTS

| | | | |
|---|---|---|---|
| 3,110,926 | 11/1963 | Martin | 17/51 X |
| 3,629,904 | 12/1971 | Zober | 17/48 X |
| 3,921,256 | 11/1975 | Huebotter | 17/71 |
| 3,962,752 | 6/1976 | Cooke et al. | 17/71 |
| 4,003,103 | 1/1977 | Wenstrom et al. | 17/71 |
| 4,004,321 | 1/1977 | Harrison | 17/48 |
| 4,019,224 | 4/1977 | Amaria et al. | 17/71 |
| 4,053,964 | 10/1977 | Rutledge | 17/48 |
| 4,073,041 | 2/1978 | Davis et al. | 17/71 |
| 4,083,084 | 4/1978 | Davis | 17/73 |
| 4,121,322 | 10/1978 | Rutledge | 17/73 |
| 4,124,920 | 11/1978 | Wenstrom et al. | 17/48 |
| 4,172,306 | 10/1979 | Hopkins | 17/73 |
| 4,202,076 | 5/1980 | Rancatore | 17/48 |
| 4,222,153 | 9/1980 | Schmidt | 17/48 X |
| 4,286,356 | 9/1981 | Wenstrom | 17/46 |
| 4,293,981 | 10/1981 | Smith | 17/71 |
| 4,316,306 | 2/1982 | Huebotter | 17/52 |
| 4,321,730 | 3/1982 | Tolley et al. | 17/71 |
| 4,337,552 | 7/1982 | Iwase | 17/71 |
| 4,361,933 | 12/1982 | Rodman | 17/48 |
| 4,380,094 | 4/1983 | Tolley et al. | 17/71 |
| 4,463,495 | 8/1984 | Johnson et al. | 30/142 |
| 4,479,284 | 10/1984 | Tolley et al. | 17/71 |
| 4,483,046 | 11/1984 | Briddell | 17/32 |
| 4,494,277 | 1/1985 | Tolley et al. | 17/71 |
| 4,494,356 | 1/1985 | Takiguchi | 53/122 |
| 4,503,586 | 3/1985 | Lockerby et al. | 17/48 |
| 4,513,478 | 4/1985 | Trahan | 17/71 |
| 4,523,349 | 6/1985 | Warren | 17/46 |
| 4,528,720 | 7/1985 | Young et al. | 17/51 X |
| 4,535,507 | 8/1985 | Reinke | 17/48 |

*Primary Examiner*—Willie G. Abercrombie
*Attorney, Agent, or Firm*—Weingarten, Schurgin, Gagnebin & Hayes

[57] ABSTRACT

An automated, self-contained apparatus for extracting meat from the appendages of crustaceans, such as crabs, the appendages having been severed from the body and cooked. The device includes a plurality of stations which recover and collect the meat in the appendages as well as dispose of the empty shell. The appendages are placed in radially extending recesses of a circular motor driven platter, the platter being used to transport the appendages from station to station. The appendages pass through a cutting station which removes the end of each appendage so that there is an opening large enough to allow the meat to be expelled and recovered when pressurized air is injected into the appendage at the next station, the meat extracting station. Pressurized air is also utilized at the third station, the shell ejectment station, to remove the empty shells from the platter.

25 Claims, 7 Drawing Figures

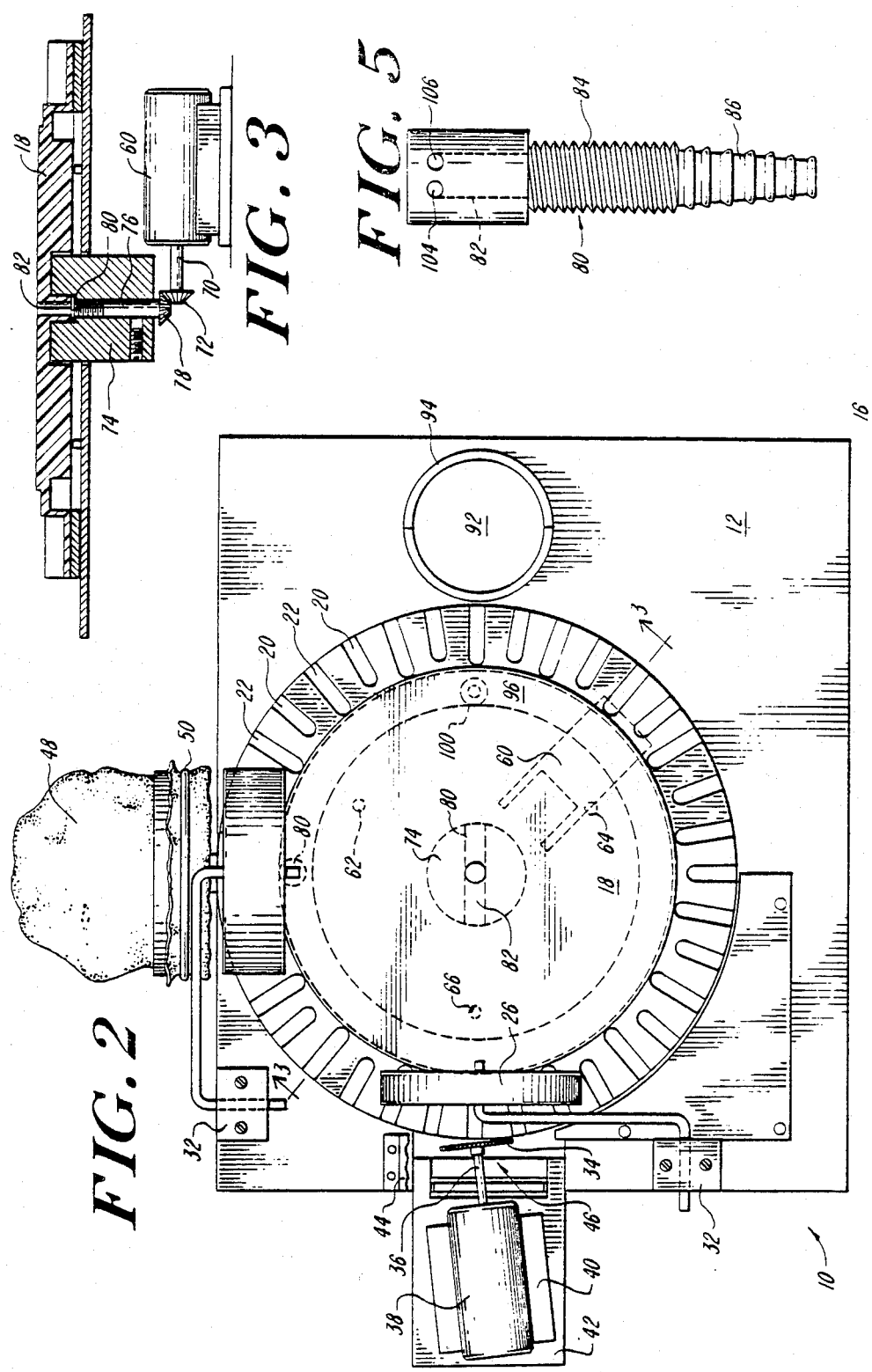

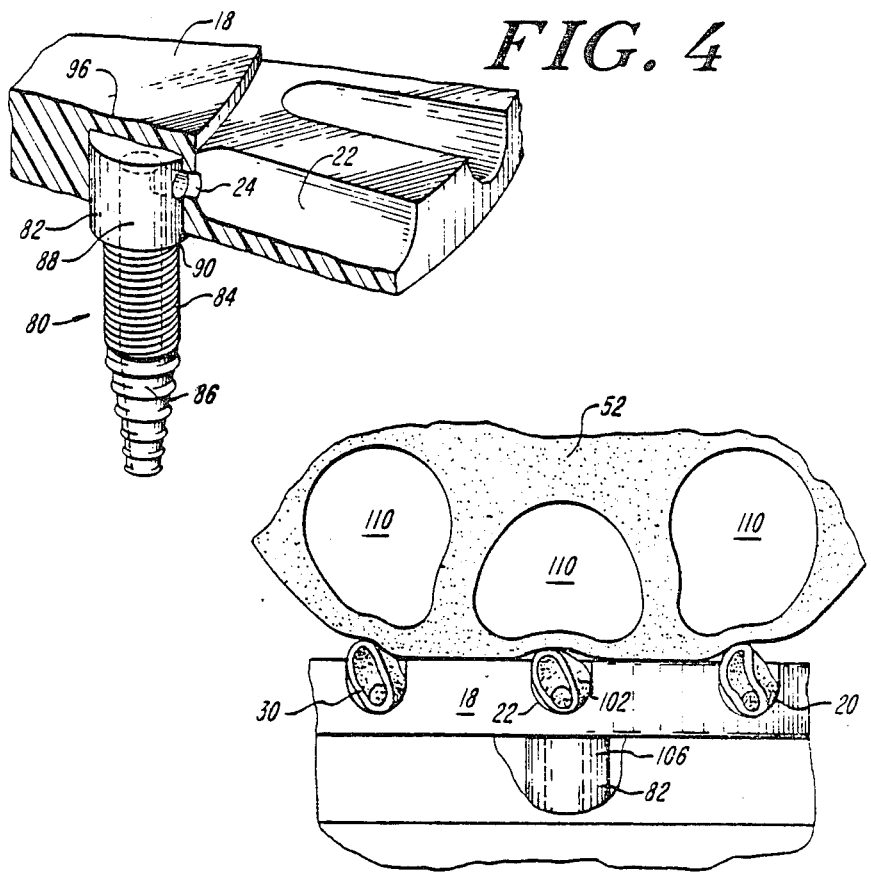
FIG. 4
FIG. 6
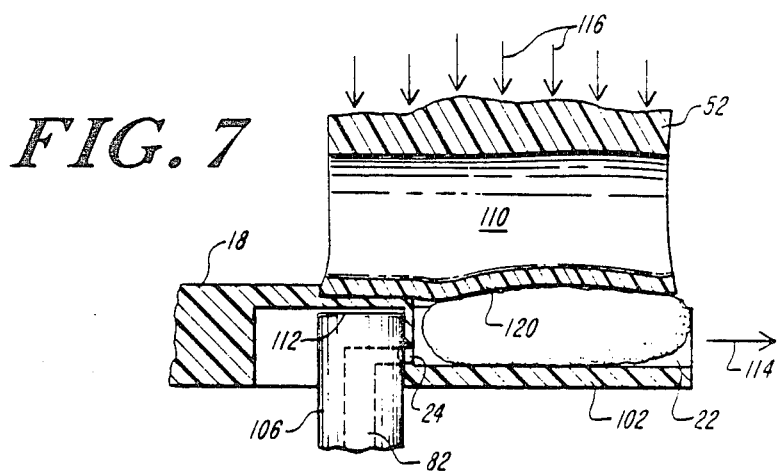
FIG. 7

# APPARATUS FOR EXTRACTING MEAT FROM CRUSTACEAN APPENDAGES

FIELD OF THE INVENTION

An apparatus for the removal and recovery of meat from crustacean appendages.

BACKGROUND OF THE INVENTION

Various prior art devices have been used to remove meat from the legs and body of a crustacean. The devices have used pinch rollers, vibrating platters, and other means to dislodge the meat from the shell. There are, however, several disadvantages. First of all, the condition of the meat once extracted varies, especially when pinch rollers are used, because of the rigorous forces used to remove it. Second, the apparatus is prone to breakdown and needs to be cleaned constantly because bits of shell, body fluid, and internal organs are scattered and interfere with the machinery. Third, if the machinery is not cleaned, a more serious problem, food contamination, may result, which could eventually threaten the lives of the consuming public.

SUMMARY OF THE INVENTION

The invention is an automated, self-contained apparatus which extracts the meat from the cooked appendages of crustaceans such as crabs. The apparatus comprises a plurality of processing stations which are positioned around the circumference of a circular platter. The platter is motor driven and includes a series of radially extending recesses in which the appendages are placed so that they can be transported from station to station. The processing of the appendages begins with a gripping wheel bracing each appendage against the platter and a motorized saw cutting off the end of each appendage protruding beyond the circumference of the platter. The amputated end is deposited directly into a disposal bag. The appendages are next rotated to an extraction station where they are secured by another gripping wheel to hold them in place and provide a seal around the appendage such that when pressurized air is injected into the intrashell cavity through a nozzle, an air pocket is created which presses against the meat and forces the meat out of the shell. The freshly extracted meat is expelled directly from the shell into a collecting bag, which is mounted adjacent to the extraction station, without coming into contact with any other component of the invention which could contaminate it. The meat is collected substantially intact, in a plump and juicy state without being pressed. The empty shell is then removed from the platter at a third station where pressurized air is used to direct the shell into a disposal tube. The recovered meat is intact and the shell and amputated end of the appendage are disposed of with only minimal cleaning of the invention required.

BRIEF DESCRIPTION OF THE DRAWINGS

These and other features of the present invention can be better understood from the solely exemplary detailed description and accompanying drawings of which:

FIG. 2 shows an overhead view of the apparatus in FIG. 1;

FIG. 3 shows a side sectional view of the drive mechanism of the invention;

FIG. 4 shows an enlarged cutaway view of the air nozzle at the meat extraction station and positioning thereof relative to the platter;

FIG. 5 shows an elevation view of the air nozzle of FIG. 4;

FIG. 6 shows a frontal view of the meat extraction station showing the gripping wheel; crustacean appendage, and platter; and FIG. 7 shows a side sectional view of the meat extraction station of FIG. 6.

DETAILED DESCRIPTION OF THE INVENTION

Figure 1:
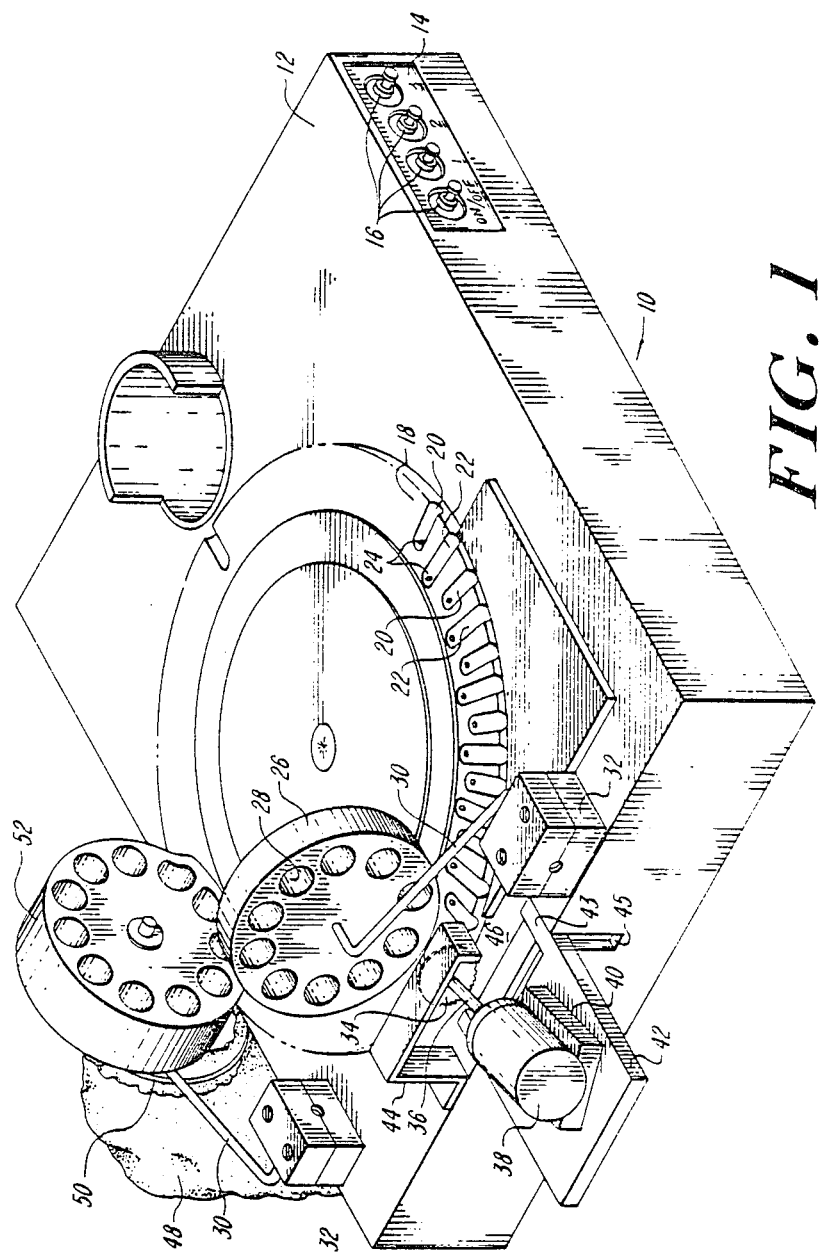
FIG. 1 shows a pictorial view of the present invention.

The present invention in FIGS. 1 and 2, shows the apparatus 10 which includes a base 12 with a control panel 14 having buttons and switches 16 which allow the operator to control the meat extracting process. Base 12 also possesses a circular platter 18 which is rotatable around its central axis, the rotational motion imparted thereto by a drive mechanism positioned below the platter. Platter 18 also includes a plurality of radially extending recesses which include short recesses 20 and long recesses 22 which are arranged alternately around the outer circumference of platter 18. Each recess is designed to hold a single appendage with the shorter appendages placed in the short recesses 20 and the longer appendages placed in long recesses 22. Each recess also includes a hold 24 which is positioned on the inner most side of each of the recesses and is facing toward the circumference of platter 18.

Platter 18 is used to transport the appendages to each of three separate processing stations. The first processing station cuts off the end of the appendage which extends beyond the outer circumferential edge of the platter on which the appendage is resting. The appendage cutting station includes an appendage gripping wheel 26 which is composed of rubber or any other resilient material. The gripping wheel should also be flexible so that as a downward force is applied to secure the appendage in position, the outer surface of the wheel conforms to the surface of the appendage and the platter, as shown in FIGS. 6 and 7. In its preferred embodiment, the gripping wheel is circular in shape and contains a series of holes 28 which are arranged in a circular pattern such that they are all equidistant from the central axis of the gripping wheel. The holes cooperate with the flexibility of the gripping wheel so that the outer circumference of the wheel conforms to the surface of the appendage, as will be discussed. An arm 30 is mounted to the gripping wheel 26 at the central axis and extends away from the wheel to a mounting block 32 which is affixed to base 12. The cutting station further includes a saw blade 34 which is connected via shaft 36 to a motor 38, motor 38 being mounted by bracket 40 to platform 42 which is also affixed to base 12. Platform 42 includes arm sections 43 which are inserted into slots 45 of base 12 such that the platform is vertically movable for positioning the saw blade 34. A shield 44 can also be included in order to minimize the amount of fragments being dispersed during the cutting process and to act as a safety guard for the operator. An opening 46 is present in base 12, directly below saw blade 34, which allows the amputated end of the appendage to fall into a bag or any other receptacle which is located below the opening.

The second station is the meat extraction station. It includes similar appendage gripping elements and further includes a meat collection bag 48 which is mounted via bracket 50 to base 12. The gripping wheel 52 at the meat extraction station is thicker than gripping wheel 26 at the cutting station in order to provide a seal around the appendage during the meat extracting step. The meat is forced from the shell by pressurized air from nozzle 80 as will be discussed with FIGS. 6 and 7.

The third station is the shell ejectment station. The empty shells are removed from platter 18 by pressurized air from a nozzle 100 located in groove 96. Nozzle 100 is similar to the meat ejectment nozzle. After being removed from the platter, the shells are deposited into a section of tubing 92, a portion of which has been cut away to leave a shield region 94 above the surface of the base. The ttubing leads to a bag or any other disposal receptacle. Since there is no gripping wheel to hold the appendage on the platter, it is forced off the platter by the air.

FIGS. 2 and 3 also show motor 60 which is mounted below platter 18, the platter rotating on three tabs 62, 64, and 66. The platter drive system includes motor 60 and motor shaft 70 with motor gear 72. Drive engagement 74 is put in mechanical communication with motor 60 via drive shaft 76 and the gear-to-gear interaction between drive gear 78 and motor gear 72. The drive engagement 74 is circular in shape and includes a slot 80 into which a complementary shaped flange 82 is placed in order to impart motion to the platter 18.

FIG. 4 shows the meat ejectment air nozzle 80 in cooperation with platter 18. Nozzle 80 is positioned as shown in FIG. 2 and is made up of an upper portion 82 which is disposed in a circular groove 96 of platter 18. Nozzle 80 also includes a threaded portion 84 and a serrated portion 86, the latter used to grip a hose (not shown) which is needed to provide a supply of pressurized air. The air travels through a first channel 88 then proceeds through a smaller channel 90 which is positioned at a ninety degree angle to channel 88. After the air exits channel 90, it passes through opening 24 of recess 22.

FIG. 5 shows a front view of the meat ejectment air nozzle 80. The preferred embodiment shows two air channels 104 and 106 on upper portion 82 of the nozzle. The two holes are used to provide two bursts of air, the second burst to dislodge the meat from the shell if the first burst did not. As the platter with opening 24 in recess 22, shown in FIG. 4, rotates past the stationary nozzle, there is an initial burst of air as hole 24 passes the first air channel 106 and a second burst of air is provided when the opening passes the second air channel 104.

FIGS. 6 and 7 show the meat extraction station gripping wheel 52, appendage 102, and recess 22 of platter 18. Gripping wheel 52 holds down appendage 102 and provides a seal around the appendage such that a pocket of air is created by pressurized air flowing from nozzle 106 through hole 24. The seal is strong enough such that the air stream from the nozzle 106 is capable of expelling the meat from the appendage while the appendage remains secured in the recess of the platter. The gripping wheel holes 110 cooperate with the flexibility of the wheel when pressure is applied in the direction of arrows 116 such that the circumference 120 of wheel conforms to the surface of a notched portion 112, located around the circumference of platter 18, and the surface of appendage 102 to provide the necessary seal and allow the pressurized air to push the meat out of the appendage in the direction of arrow 114.

It is intended that the above-mentioned embodiments be illustrative of the present invention and the invention only be limited by the following claims.

What is claimed is:

1. Apparatus for removing and collecting meat from crustacean appendages, each appendage having a first end and a second end, the second end being an open end, comprising:
    a frame having first, second and third functional stations located thereon;
    means mounted to said frame for holding and transporting each said appendage sequentially from said first to said second to said third functional stations, respectively;
    said first functional station including
        means for cutting off said first end of each said appendage to form an amputated end on each said appendage, and
        a first gripping means flexibly conforming to each said appendage to secure each said appendage adjacent said cutting means during removal of said first end thereof,
    said second functional station including
        means for injecting pressurized gas to interact with said second end of each said appendage thereby to force said meat out of each said appendage through said amputated end of said appendage, and wherein said pressurized gas injecting means is stationary with respect to and isolated from each said appendage, and
        a second gripping means flexibly conforming to each said appendage and interacting with said holding and transporting means to create a seal about each said appendage with respect to said pressurized gas injecting means and to secure each said appendage adjacent said pressurized gas injecting means as said meat is forced out of each said appendage, and
    said third functional station including means for removing each said appendage from said holding and transporting means.

2. The apparatus according to claim 1 wherein said holding and transporting means is a circular platter having a plurality of radially extending recesses to hold said appendages, each said recess having sides, an open end on the outer circumference of said circular platter and a closed end opposing said open end, and wherein said circular platter is rotated to transport said appendages sequentially from said first to said second to said third functional stations, respectively.

3. The apparatus according to claim 1 wherein said cutting means is a motor driven circular saw.

4. The apparatus according to claim 1 wherein said first functional station further includes a means for collecting each said first end after removal from said appendage.

5. The appendage according to claim 4 wherein said first end collecting means is a bag.

6. The apparatus according to claim 1 wherein said first gripping means is a first wheel.

7. The apparatus according to claim 6 wherein said first wheel is flexible and resilient.

8. The apparatus according to claim 1 wherein said cutting means is mounted to a platform which is vertically movable relative to said holding and transporting means.

9. The apparatus according to claim 1 wherein said first functional station further includes a first shielding means mounted on said frame and positioned to at least partially cover said cutting means.

10. The apparatus according to claim 6 wherein said first wheel is connected to a first arm and said first arm is mounted to said frame such that said first wheel is vertically movable.

11. The apparatus according to claim 2 wherein said closed end of each said recess includes a hole which is aligned and co-extensive with said second end of said appendage disposed in said recess.

12. The apparatus according to claim 11 wherein said pressurized gas injecting means includes a first nozzle connected to a gas supply, said first nozzle being stationarily positioned to align with said hole of each said recess as said circular platter is rotated such that when said pressurized gas flows through said first nozzle, said hole, and said second end to interact with said second end of said appendage, said meat is forced out of said appendage through said amputated end.

13. The apparatus according to claim 1 wherein said pressurized gas is air.

14. The apparatus according to claim 12 wherein said second gripping means is a second wheel.

15. The apparatus according to claim 14 wherein said second wheel is flexible and resilient so as to secure said appendage and to create said seal sufficient to create a gas pocket adjacent said meat at said second end of said appendage such that the pressure of said pressurized gas forces said meat out of said appendage through said amputated end thereof.

16. The apparatus according to claim 14 wherein said second wheel is connected to a second arm and said second arm is mounted to said frame such that said second wheel is vertically movable.

17. The apparatus according to claim 1 wherein said second functional station further includes means for collecting said meat forced out of said appendage through said amputated end, said collecting means being positioned such that said meat becomes deposited therein upon exiting from said appendage.

18. The apparatus according to claim 17 wherein said meat collecting means includes a bag mounted to said frame.

19. The apparatus according to claim 2 wherein said circular platter is motor driven in rotation.

20. The apparatus according to claim 1 wherein said third functional station further includes means for collecting each said appendage after removal from said holding and transporting means.

21. The apparatus according to claim 1 wherein said third functional station includes a second nozzle connected to a gas supply, said second nozzle aligned to force each said appendage from said holding and transporting means by a directional flow of said gas therefrom.

22. The apparatus according to claim 21 wherein said third functional station further includes a means for collecting said appendages after removal from said holding and transporting means.

23. The apparatus according to claim 22 wherein said collecting means further includes a disposal tube with an opening adjacent said holding and transporting means, said opening aligned with said directional flow of said gas such that after said appendage has been expelled from said holding and transporting means, said appendage becomes deposited in said opening.

24. The apparatus according to claim 23, further including a second shielding means adjacent said opening such that said opening is positioned between said holding and transporting means and said second shielding means.

25. Apparatus for removing and collecting meat from crustacean appendages, each appendage having a first end and a second end, the second end being an open end, comprising:
a frame having first, second and third functional stations located thereon;
means mounted to said frame for holding and transporting each said appendage sequentially from from said first to said second to said third functional stations, respectively, said holding and transporting means including
a circular platter with a plurality of radially extending recesses to hold said appendages, each said recess having sides, an open end on the outer circumference of said circular platter and a closed end opposing said open end,
said closed end of each recess having a hole formed therethrough, said hole aligned and co-extensive with said second end of said appendage and
a motor drive in communication with said circular platter to impart rotational movement thereto, and
said first functional station including
a motor driven saw for cutting off said first end of each said appendage to form an amputated end thereon,
a first gripping wheel which is resilient and flexible and positioned so as to secure each said appendage adjacent said motor driven saw during removal of said first end thereof,
a platform to which said motor driven saw is mounted, said platform being vertically movable relative to said holding and transporting means,
a first shielding means mounted on said frame and positioned to at least partially cover said motor driven saw, and
means positioned adjacent said motor driven saw for receiving and collecting said first ends after removal thereof from said appendage;
said second functional station including
a stationary first nozzle connected to a gas supply, said first nozzle being isolated from each said appendage disposed in said recess by being positioned to align said hole of each recess of said circular platter such that said gas flowing through said first nozzle, said hole, and said second end, respectively, interacts with said second end of each said appendage, whereby said meat is forced out of said appendage through said amputated end,
a second gripping wheel flexible and resilient to conform to each said appendage and interacting with said circular platter to secure said appendage and provide a seal thereabout sufficient to create a gas pocket adjacent said meat in said second end of said appendage such that the pressure of said gas forces said meat out of said appendage through said amputated end thereof, and
means for collecting said meat, including a bag mounted to said frame and positioned such that said meat is deposited therein upon exiting said appendage; and
said third functional station including a second nozzle connected to said gas supply, said second nozzle aligned to force each said appendage from said holding and transporting means by a directional flow of said gas therefrom, means for collecting said appendages after removal from said holding and transporting means, including a disposal tube with an opening adjacent said holding and transporting means, said opening aligned with said directional flow of said gas such that after each said appendage is expelled from said holding and transporting means, said appendage is deposited in said opening, and a second shielding means adjacent said opening such that said opening is positioned between said holding and transporting means and said second shielding means.

* * * * *